United States Patent [19]

Kado et al.

[11] Patent Number: 5,218,835
[45] Date of Patent: Jun. 15, 1993

[54] FOOD SERVICE COUNTER OF THE ICE STORAGE TYPE

[75] Inventors: Syuji Kado, Toyaoke; Susumu Tatematsu, Nagoya; Hideyuki Ikari, Kariya; Junichi Hida, Nagoya, all of Japan

[73] Assignee: Hoshizaki Denki Kabushiki Kaisha, Toyoake, Japan

[21] Appl. No.: 842,882

[22] Filed: Feb. 28, 1992

[30] Foreign Application Priority Data

Mar. 22, 1991 [JP] Japan ............................ 3-025467[U]

[51] Int. Cl.$^5$ ................................................ F25C 5/18
[52] U.S. Cl. ........................................ 62/137; 62/258; 366/208
[58] Field of Search .................. 366/208, 213; 62/137, 62/258, 344

[56] References Cited

U.S. PATENT DOCUMENTS

| 3,144,755 | 8/1964 | Kattes | 62/137 |
| 3,192,734 | 7/1965 | Swanson | 62/137 |
| 4,227,377 | 10/1980 | Miller | 62/137 X |
| 4,863,847 | 2/1989 | Koeneman et al. | 62/137 X |

Primary Examiner—William E. Tapolcai
Attorney, Agent, or Firm—Nikaido, Marmelstein, Murray & Oram

[57] ABSTRACT

An ice storage type food service counter composed of an ice storage tank 20 arranged to store an amount of ice and having a drain hole 24 at a bottom, an ice supply device 30 for automatically producing chips of ice and supplying them into the tank, an agitating device 40 arranged within the tank for agitating and leveling the chips of ice stored in the tank, a container assembly B detachably mounted on the agitating device 40 and placed on the stored chips of ice to contain drink and food therein, and a transparent cover plate 18 coupled over the ice storage tank 20, the cover plate having an opening through which the container assembly can be placed on the stored chips of ice.

2 Claims, 4 Drawing Sheets

FOOD SERVICE COUNTER OF THE ICE STORAGE TYPE

BACKGROUND OF THE INVENTION

1. Field of the Invention

The present invention relates to a food service counter of the ice storage type for displaying containers, which can contain cold beverages and food, such as salad, on ice.

2. Description of the Prior Art

A conventional ice storage type food service counter of this kind is designed to display containers containing drive and food within an ice storage tank where chips of ice prepared by an ice making machine are manually carried and leveled.

Such a conventional ice storage type food service counter requires, however, that chips of ice be manually carried into the ice storage tank and leveled, and that, every time ice melts away, fresh ice be supplemented and leveled also manually.

SUMMARY OF THE INVENTION

The present invention has been achieved with a view to solving the above problems, and it is therefore a primary object of the present invention to provide an ice storage type food service counter which is designed to automatically supply fresh ice into an ice storage tank and level it and is able to be safely used in a clean condition.

According to the present invention, there is provided an ice storage type food service counter which comprises an ice storage tank arranged to store an amount of ice and having a drain hole at a bottom, an ice supply device for automatically producing chips of ice and supplying them into the ice storage tank, an agitating device arranged within the ice storage tank for agitating and leveling the chips of ice stored in the ice storage tank, a container assembly detachably mounted on the agitating device and placed on the stored chips of ice to contain drink and food therein, and a transparent cover plate coupled over the ice storage tank, the cover plate having an opening through which the container assembly can be placed on the stored chips of ice. According to an aspect of the present invention, there is provided an ice storage type food service counter wherein the container assembly is composed of a support container mounted on the agitating device for rotation therewith and embedded into the stored chips of ice at its lower portion and a service container coupled within the support container to contain food and drink therein, and wherein an upper peripheral edge of the support container is positioned under the opening of the cover plate and outside of the same.

DESCRIPTION OF THE PREFERRED EMBODIMENTS

Figure 1:
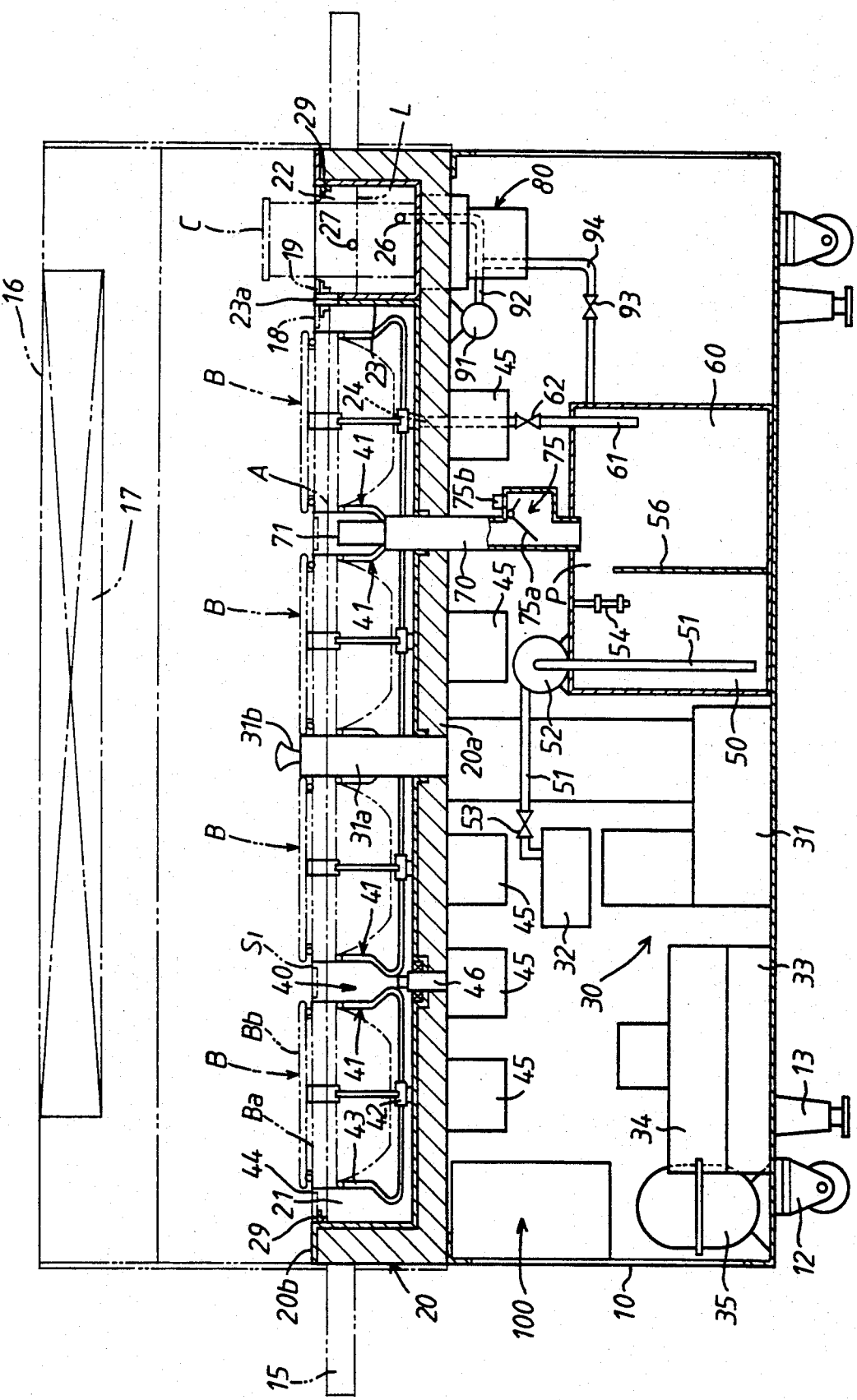
FIG. 1 is a vertical sectional view of a first embodiment of an ice storage type food service counter in accordance with the present invention.

A first embodiment of the present invention will now be described with reference to FIGS. 1 and 2 of the drawings. As shown in FIG. 1, an ice storage tank 20 is fixedly mounted on a support frame 10 which is supported on the floor by means of casters 12 and legs 10. Provided in the under the ice storage tank 20 are an ice supply device 30 for automatically supplying chips of ice into the ice storage tank 20, a water supply tank 50, a discharge tank 60, a control device 100, etc. as well as the essential portions of an agitating device 40 which agitates chips of ice supplied into the ice storage tank 20 to level them. A table 15 is provided around the ice storage tank 20. Above the ice storage tank 20 is located an open type hood 16 provided with lighting equipment 17.

Figure 2:
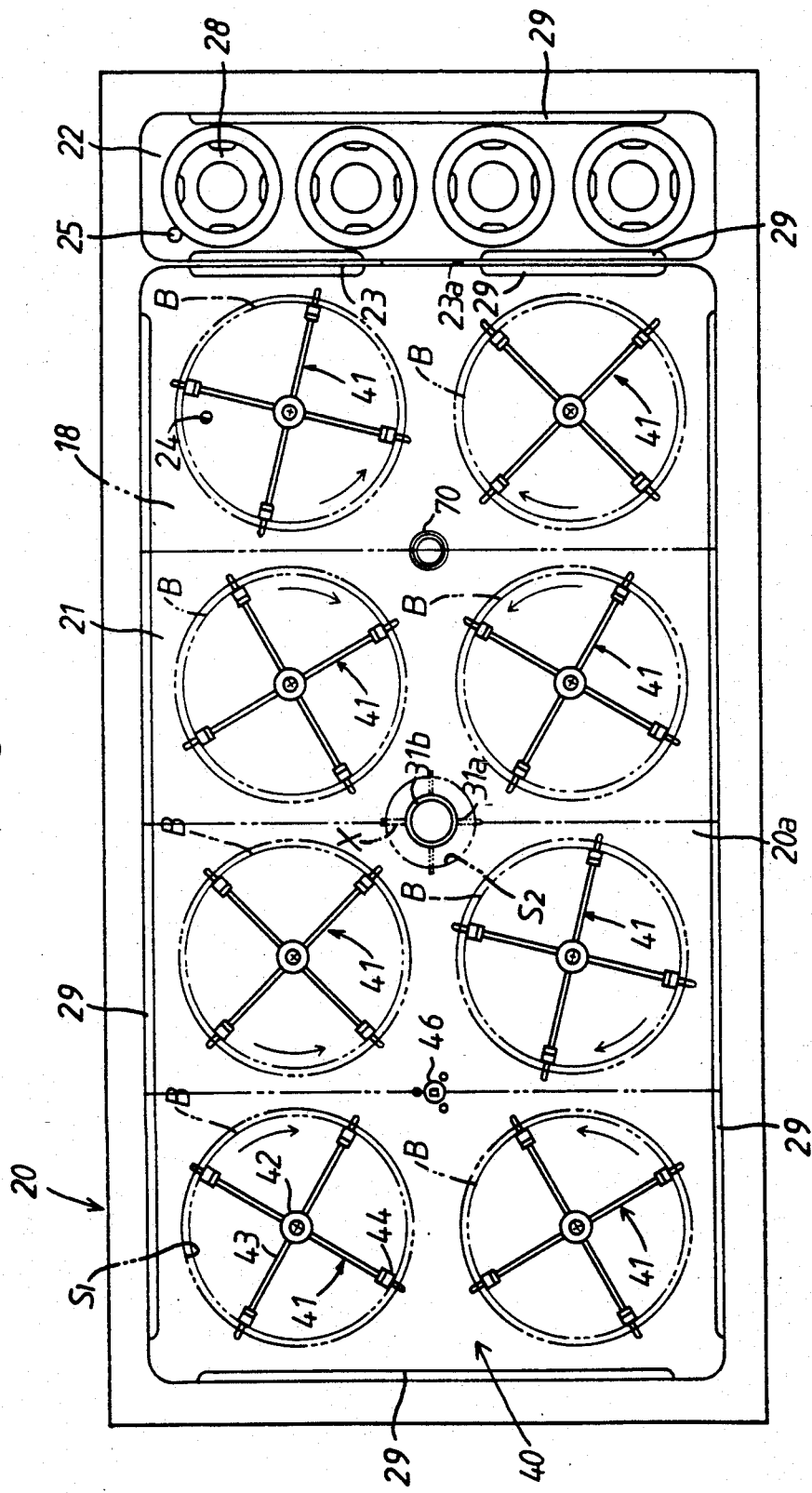
FIG. 2 is a plan view of the service counter.

As shown in FIGS. 1 and 2, the ice storage tank 20 comprises an insulative outer box lined with a rust preventing material, such as stainless steel or synthetic resin, shaped into a rectangular shallow box with the top open. Part of the line of the ice tank 20 stands upright to form a partition 23 which subdivides the interior of the ice storage tank 20 into a large main tank 21 and a small sub-tank 22. A recess 23a is formed in the center of the upper edge of the partition 23 to provide communication between both the tanks 21 and 22. The lower edge of the recess 23a is positioned slightly lower than a predetermined ice level A to permit the chips of ice supplied from the main tank 21 into the aub-tank 22. As shown in FIG. 2, a drain hole 24 is formed in the bottom of main tank 21.

As shown in FIG. 2, the sub-tank 22 is provided at its bottom with a drain hole 25 which is connected to a supply hole 26 through a circulation pump 91 and a connecting pipe 92. The supply hole 26 is formed in one side of the bottom of sub-tank 22. The connecting pipe 92 is connected at its intermediate portion to the discharge tank 60 by means of a bypass pipe 94 provided with a drain cock 93. The sub-tank 22 is formed with an overflow hole 27 at a position slightly lower than the recess 23a to drain the water lower than a predetermined level L into the discharge tank through a drain pipe (not shown).

The ice supply device 30 is a well-known auger type ice making machine whose essential portions include an ice making mechanism 31, a water tank 32, a condenser 33, a cooling fan 34 and a compressor 35 which are all disposed within the support frame 10, except for the upper portion of the ice making mechanism 31. The ice making mechanism 31 comprises an evaporator, an auger and a drive motor (not shown). A cylindrical member 31a is vertically extended into the main tank 21 through a bottom plate 20a of the ice storage tank 20 in a liquid-tight manner and has an ice delivery port 31b positioned slightly higher than an upper edge 20b of the ice storage tank 20. As will be described later, ice making water is supplied to the water tank 32 from the water supply tank 50 to be supplied to the ice making mechanism 31 where it is formed into chips of ice of about 1 to 2 cm in size, and the chips of ice are carried up to fall into the main tank 21 from the ice delivery port 31b.

As shown in FIGS. 1 and 2, the agitating device 40 comprises agitators 41 mounted on a plurality of drive shafts 46 and drive motors 45 for rotating the agitators 41. In this embodiment, there are nine geared motors used as the drive motors 45, with their output shafts being the drive shafts 46. Each drive motor 45 is fixed to the bottom of the ice storage tank 20, with the drive shaft 46 pernetrating the bottom plate 20a in a liquid-tight manner so that its tip protrudes slightly into the ice storage tank 20. As shown in FIG. 2 of a plan view, the individual drive shafts 46 are arranged eight in two rows at equally lateral and longitudinal distances and the last one located just at the center of those four drive shafts which are located away from the sub-tank 22 than the other four. Each drive shaft 46 has a rectangular top end where the associated agitator 41 is to be mounted. Although in this embodiment, each drive shaft 46 is driven by a single drive motor 45 and its rotational speed and direction can be adjusted by the control device 100, the indivisual drive shafts 46 may be linked by an appropriate link mechanism to be driven by fewer drive motors.

As shown in FIGS. 1 and 2, the agitator 41 has a boss section 42 to be detachably coupled with the top end of the drive shaft 46, four arm portions 43 each having one end fixd to the boss section 42 and extending radially outwardly before bent upward, and stoppers 44 pivoted on the upper ends of the respective arm portions 43. The individual agitators 41, except the stoppers 44, are positioned in the chips of ice stored in the ice storage tank 20 to a predetermined level (to be described later). Each boss section 42 has a rectangular hole in the center in which the top end of drive shaft 46 is to be coupled, and is securely fastened to the drive shaft 46 by means of a screw. As clearly shown in FIG. 1, the arm portion 43 of agitator 41 mostly extends in the radial direction close to the bottom of main tank 21, and it outer end is bent inward at the place it is bent upward after reaching further out than the stopper 44. This design is taken to increase the area for contact with the chips of ice, thereby improving the ice agitating effect which will be described later. The rotational speed of the agitator 41 is several rotations per minute. The agitator 41 is in no way limited to this particular shape, but may be modified to have various other shapes. While the rotational directions of the individual agitators 41 are determined such that the adjacent agitators rotate in the opposite directions as illustrated in FIG. 2, the agitators may rotate with various other direction patterns.

Containers B each comprise a transparent glass support container Ba and a service container Bb. The support container Ba is mounted on the associated agitator 41 with its edge portion held by the stoppers 44, and is designed to receive the service container Bb which contains cold food and drink, such as salad. Although in this embodiment the agitator 41 is not mounted on the drive shaft 46 in the left center in FIG. 2, the drive shaft 46 is reserved for the use to mount, for example, a large agitator for supporting a support container of large diameter, in which case small agitators are mounted on the surrounding four drive shafts 46, or no agitators are mounted thereon. Alternatively, the small agitators for supporting support containers of small diameter may be mounted on those five drive shafts 46.

While in this embodiment, the water supply tank 50 and the discharge tank 60 are formed by separating a single tank with a partition as shown in FIG. 1, they may be independent and separate tanks. The tanks 50 and 60 each are provided at their bottoms with a drain cock (not shown). Ice making water in the water supply tank 50 is supplied into the water tank 32 via a water supply pump 52 and a supply line 51 equipped with a water supply solenoid valve 53. The level of water in the water tank 32 is kept always constant by controlling the pump 52 and the solenoid valve 53 by means of a float switch (not shown) which is activated when the water level in the water tank 32 becomes a predetermined level. Alternatively, an overflow pipe may be provided within the water tank 32 without providing the float switch. In such a case, the overflow pipe is connected to the water supply tank 50, and the water pump 52 is continually operated during an ice making cycle so that the overflow pipe returns an excessive amount of water to the water supply tank 50 therethrough to maintain the level of water in water tank 20 at the predetermined level.

The drain hole 24 in the bottom of main tank 21 is communicated with the interior of the discharge tank 60 through a drain pipe 61 provided with a discharge solenoid valve 62 so that water of melted ice in the main tank 21 is discharged into the discharge tank 60. The tanks 50 and 60 are communicated to each other through a space above the partition 56. When the level of water in discharge tank 60 becomes higher than the height of patition 56, the discharged water flows from the discharge tank 60 into the water supply tank 50. The water supply tank 50 is provided at its upper portion with a water level detector 54 which is operated when the level of water in tank 50 becomes a maximum allowable level. When the water level detector 54 is operated, the discharge solenoid valve 62 of the drain pipe 61 is closed under control of the control device 100.

As shown in FIGS. 1 and 2, an overflow pipe 70 is vertically extended into the main tank 21 through the bottom plate 20a of ice storage tank 20 in a liquid-tight manner. The overflow pipe 70 has an upper opening 71 located slightly lower than the upper edge 20b of the ice storage tank 20 and a lower end opening extended into the interior of discharge tank 60. When the level of chips of ice, supplied from the ice supply device 30 into the main tank 21 and leveled by the agitating device 40, reaches a predetermined level slightly higher than the upper opening 71 of overflow pipe 70 (but lower than the upper edge 20b), individual chips of ice fall into the discharge tank through the overflow pipe 70. In an intermediate portion of the overflow pipe 70 there is provided an ice detector 75 which is composed of a spring loaded flapper 75 pressed into contact with the inner wall of overflow pipe 70 and a proximity switch 75b cooperable with the flapper 75.

In this embodiment, the sub-tank 22 is formed to contain four salad-dressing containers C the interior of which is agitated by an agitating device 80. The agitating device 80 is of a noncontact permanent magnetic type, which is constructed to rotate an impeller (not shown) mounted within the bottom portion of salad-dressing container C. The salad-dressing containers C each are provided at their bottoms with a mounting bracket (not shown) which is detachably coupled with a suppot bracket 28 fixed to the bottom of sub-tank 22. (see FIG. 2) In use of the food service counter, it is desirable that an amount of water is stored in the bottom portion of sub-tank 22 to facilitate mounting or removal of the salad-dressing containers C without any disturbance caused by the chips of ice.

In the food service counter, trasparent cover plates 18 and 19 are attached to the upper portions of tanks 21 and 22 in such a manner as to make the interior of tanks 21, 22 visible therethrough. The respective transparent cover plates 18, 19 are detachably supported on support members 29 secured to the upper peripheral edges of tanks 21 and 22. As shown in FIG. 2, the cover plate 18 is formed with an opening S1 through which the containers B are inserted into the interior of tank 21 and is further formed with an opening S2 through which the chips of ice from the cylindrical member 31a fall into the interior of tank 21. Similarly, the cover plate 19 is formed with an opening through which the salad-dressing containers C are inserted into the interior of sub-tank 22. Although in this embodiment the cover plate 18 is divided into four plates as shown in FIG. 2, the cover plate 18 may be integrally formed as a single plate. In such a case, it is preferable that as shown by imaginary lines in FIG. 2, the cylindrical member 31a is integrally provided at its upper portion with crossed support arms X to receive the central portion of cover plate 18 thereon.

When the ice storage type food service counter of the first embodiment is operated, water in the water supply tank 50 is fed by the water pump 52 to the water tank 32 from which it is supplied to the ice making mechanism 31 to be formed into chips of ice. The chips of ice are then supplied into the main tank 21 from the ice delivery port 31b. Subsequently, the chips of ice are automatically distributed all over the interior of main tank 21 and leveled by rotation of the agitators 41. When the ice level in main tank 21 approaches a predetermined level, those chips of ice above that level fall into the sub-tank 22 through the recess 23a of partition 23 and float on the circulating water previously stored in the sub-tank 22 to refrigerate the sala-dressing containers C.

When the ice level in main tank 21 reaches the predetermined level A, the chips of ice above that level fall into the discharge tank 60 through the overflow pipe 70. When the passing of ice is detected by the ice detector 75, the activation of the ice making mechanism 31 is stopped under control of the control device 100 for a predetermined time to keep the ice level at the predetermined level A. In such a situation, the food service counter is used with the food and drink containing service containers Bb coupled within the support containers Ba. When the water in tank 50 is eliminated, the ice supply device 30 is deactivated under control of the control device 100.

During such use of the food service counter, the chips of ice successively fall into the main tank 21 from the ice delivery port 31b of cylindrical member 31a, and the chips of ice are moved around by rotation of the agitators 41. Thus, an excellent display effect can be obtained as well as the food and drink in the service containers Bb can be refrigerated. The movement of the chips of ice can be seen through the transparent cover plates 18 and 19. Since the chips of ice are agitated by the agitators 41 in main tank 21 covered with the cover plates 18, the user's hands can be protected from careless contact with the agitators 41 in operation. The cover plates 18 and 19 are also useful to prevent the food and drink from falling into the ice storage tank 20 and to prevent the drain holes 24, 25 from being choked with foreign substances. Additionally, the cover plates 18 and 19 act as heat resistant plates to greatly reduce a portion of the ice directly exposed to the outside air, reducing the melting amount of ice in the ice storage tank 20.

The water of melted ice in main tank 21 is discharged from the drain hole 24 into the discharge tank 60 through the drain pipe 61 and solenoid valve 62. When the level of water in the discharge tank 60 becomes higher than the partition 56, the discharged water flows into the water supply tank 50 from the discharge tank 60 over the partition 56. This is useful to prevent overflow of the water from the discharge tank 60 and to recycle the discharged water into the water supply tank 50 such that the food service counter can be used for a long time. When the water in tank 50 becomes the highest allowable level, for instance, due to the chips of ice preliminarily carried into the ice storage tank 20, the solenoid valve 82 is closed under control of the control device 100, and the ice supply devic 30 is deactivated if it is being activated. If the ice supply device 30 is deactivated upon lapse of an appropriate time after the solenoid valve 62 has been closed, overflow of the water from the tanks 50 and 60 will be avoided.

Figure 3:
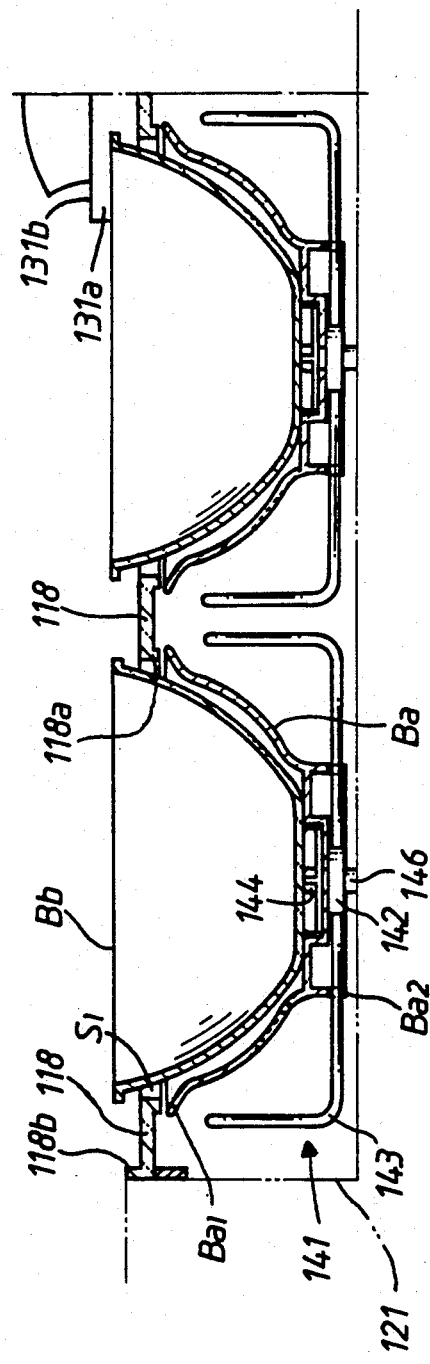
FIG. 3 is a partly enlarged vertical sectional view of a second embodiment of the present invention.
Figure 4:
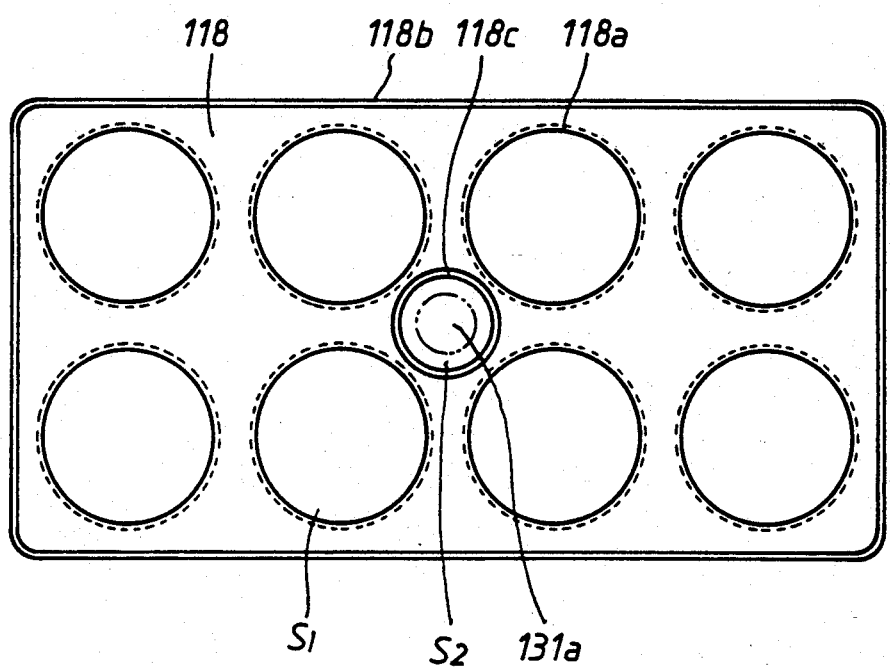
FIG. 4 is a plan view of transparent cover plates shown in FIG. 3.

In FIGS. 2 and 3, there is illustrated a second embodiment of the present invention, wherein the upper peripheral edge Ba1 of the support container Ba is positioned under the opening S1 of cover plate 118 and outside of the same. The cover plate 118 is formed at the peripheral edge of its opening S1 with an annular downward flange 118a for introducing the liquidity food and drink into the support container Ba without causing entry of the same into the ice storage tank 20. As shown in FIG. 4, the cover plate 118 is also formed at its outer peripheral edge with an upward flange 118b for preventing entry of foreign substances into the main tank 121 and at the peripheral edge of its opening S2 with an annular upward flange 118c for preventing entry of foreign substances into the main tank 121. In this embodiment, the support container Ba is mounted on the top end of drive shaft 146 together with the agitator 141 by means of a thumb bolt 144 for rotation therewith. Thus, the agitator 141 and support container Ba can be mounted to and removed from the drive shaft at the same time. In addition, the support container Ba is formed at its bottom portion with recesses Ba2 for engagement with arm portions 143 of agitator 141.

Figure 5:
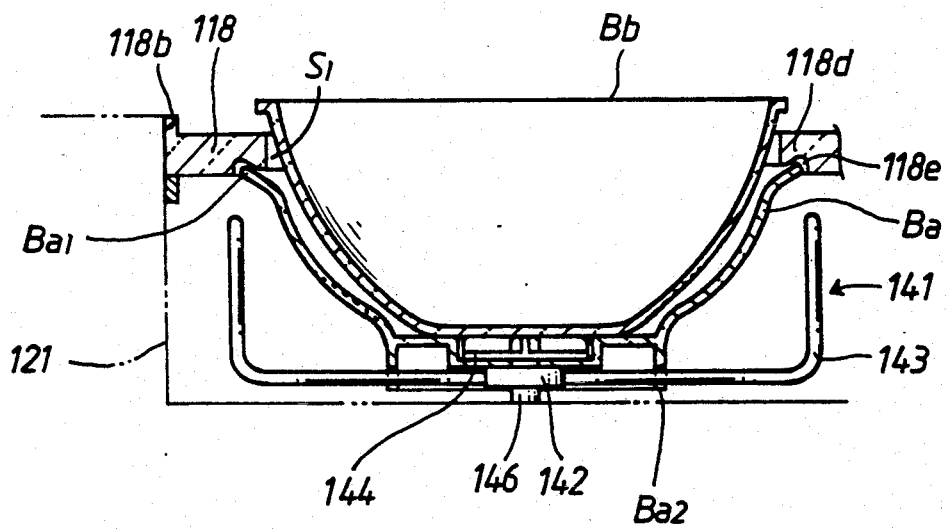
FIG. 5 is a partly enlarged vertical sectional view of a third embodiment of the present invention.

In FIG. 5, there is illustrated a third embodiment of the present invention, wherein the cover plate 118 is formed at the peripheral portion 118d of its opening S1 with an annular groove 118e to be coupled with the upper peripheral edge Ba1 of support container Ba. The other construction is substantially the same as the second embodiment.

What is claimed is:

1. An ice storage type food service counter comprising:
    an ice storage tank arranged to store an amount of ice and having a drain hole at a bottom;
    an ice supply device for automatically producing chips of ice and supply them into said ice storage tank;
    an agitating device arranged within said ice storage tank for agitating and leveling the chips of ice stored in said storage tank;
    a container assembly detachably mounted on said agitating device and placed on the stored chips of ice to contain drink and food therein; and
    a transparent cover plate coupled over said ice storage tank, said cover plate having an opening through which said container assembly can be placed on the stored chips of ice.

2. An ice storage type food service counter as claimed in claim 1, wherein said container assembly is composed of a support container mounted on said agitating device for rotation therewith and embedded into the stored chips of ice at its bottom portion and a service container coupled within said support container to contain food and drink therein, and wherein an upper peripheral edge of said support container is positioned under the opening of said cover plate and outside of the same.

* * * * *

UNITED STATES PATENT AND TRADEMARK OFFICE
CERTIFICATE OF CORRECTION

PATENT NO. : 5,218,835
DATED : June 15, 1993
INVENTOR(S) : Syuji KADO et al

It is certified that error appears in the above-identified patent and that said Letters Patent is hereby corrected as shown below:

On the title page, Item [75], line 1, change "Toyaoke" to -- Toyoake --.

Signed and Sealed this

Fifteenth Day of February, 1994

Attest:

BRUCE LEHMAN

Attesting Officer

Commissioner of Patents and Trademarks